(12) United States Patent
Sandberg et al.

(10) Patent No.: US 12,280,797 B2
(45) Date of Patent: Apr. 22, 2025

(54) VALIDATION OF TRAJECTORY PLANNING FOR AUTONOMOUS VEHICLES

(71) Applicant: Waymo LLC, Mountain View, CA (US)

(72) Inventors: Oskar Sandberg, Sunnyvale, CA (US); Daniel Sparks, San Francisco, CA (US); Shahab Kaynama, Mountain View, CA (US); Jonathan Mulligan, San Francisco, CA (US)

(73) Assignee: Waymo LLC, Mountain View, CA (US)

( * ) Notice: Subject to any disclaimer, the term of this patent is extended or adjusted under 35 U.S.C. 154(b) by 271 days.

(21) Appl. No.: 17/863,758

(22) Filed: Jul. 13, 2022

(65) Prior Publication Data

US 2024/0017741 A1    Jan. 18, 2024

(51) Int. Cl.
| | |
|---|---|
| *B60W 60/00* | (2020.01) |
| *B60W 30/14* | (2006.01) |
| *B60W 40/06* | (2012.01) |
| *G01C 21/34* | (2006.01) |

(52) U.S. Cl.
CPC ...... *B60W 60/0011* (2020.02); *B60W 30/146* (2013.01); *B60W 40/06* (2013.01); *G01C 21/34* (2013.01); *B60W 2554/80* (2020.02)

(58) Field of Classification Search
CPC .......... B60W 2554/80; B60W 30/146; B60W 30/095; B60W 30/0953; B60W 30/0956; B60W 40/06; B60W 60/001; B60W 60/0011; G01C 21/34; G08G 1/166
See application file for complete search history.

(56) References Cited

U.S. PATENT DOCUMENTS

| | | | |
|---|---|---|---|
| 10,379,533 B2 * | 8/2019 | Bier | G05D 1/0257 |
| 11,255,679 B2 * | 2/2022 | Dean | G01C 21/3889 |
| 11,738,772 B1 * | 8/2023 | Beller | B60W 30/09 |
| | | | 701/26 |
| 2020/0097014 A1 * | 3/2020 | Wang | G05D 1/0088 |
| 2020/0117199 A1 * | 4/2020 | Akella | B60W 30/143 |
| 2020/0225669 A1 * | 7/2020 | Silva | G06N 20/00 |
| 2020/0240800 A1 * | 7/2020 | Voznesensky | G05D 1/0212 |
| 2020/0371533 A1 | 11/2020 | Kentley-Klay et al. | |
| 2021/0197798 A1 * | 7/2021 | Funke | B62D 15/0285 |
| 2021/0197819 A1 * | 7/2021 | Okamoto | B60W 30/06 |
| 2021/0380105 A1 | 12/2021 | Hudecek et al. | |
| 2021/0394786 A1 * | 12/2021 | Zhu | B60W 30/18163 |
| 2022/0135075 A1 | 5/2022 | Ng et al. | |
| 2022/0381569 A1 * | 12/2022 | Khan | G01C 21/3446 |
| 2022/0402485 A1 * | 12/2022 | Kobilarov | B60W 30/0956 |

(Continued)

*Primary Examiner* — Jaime Figueroa
*Assistant Examiner* — Zachary Joseph Wallace
(74) *Attorney, Agent, or Firm* — Botos Churchill IP Law

(57) ABSTRACT

Aspects of the disclosure provide controlling an autonomous vehicle. For example, a first trajectory generated by a first planning system may be received. A portion of the first trajectory may be input into a second planning system. A second trajectory generated by the second planning system based on the portion of the first trajectory may be received. The second trajectory may be used to determine whether to validate the first trajectory, and when the second trajectory is determined to be validated, the autonomous vehicle may be enabled to be controlled based on the first trajectory.

18 Claims, 14 Drawing Sheets

(56) References Cited

U.S. PATENT DOCUMENTS

| | | | |
|---|---|---|---|
| 2023/0097121 A1* | 3/2023 | Schwartz | B60W 60/0015 |
| | | | 701/26 |
| 2023/0099853 A1* | 3/2023 | Mangas | B60W 40/02 |
| 2023/0132512 A1* | 5/2023 | Clawson | B60W 60/0027 |
| | | | 701/26 |

* cited by examiner

VALIDATION OF TRAJECTORY PLANNING FOR AUTONOMOUS VEHICLES

BACKGROUND

Autonomous vehicles for instance, vehicles that may not require a human driver, can be used to aid in the transport of passengers or items from one location to another. Such vehicles may operate in a fully autonomous mode where passengers may provide some initial input, such as a pickup or destination location, and the autonomous vehicle maneuvers itself to that location. Autonomous vehicles are equipped with various types of sensors in order to detect objects in the surroundings. For example, autonomous vehicles may include sonar, radar, camera, lidar, and other devices that scan, generate and/or record data about the vehicle's surroundings in order to enable the autonomous vehicle to plan trajectories in order to maneuver itself through the surroundings.

These trajectory may be generated by a planning system of an autonomous vehicle in order to enable the autonomous vehicle to use the trajectory for some brief period of time in order to follow a route to a destination. Such trajectories may include those that can be expressed as a function of time and are periodically and iteratively replaced (e.g., many times per second). The planning systems which generate these trajectories require significant testing. As such, when there are significant, or in some instances, even minor changes to such planning systems, the safety and reliability may again need to be rigorously tested in both simulated and real-world environments. However, many millions of miles of real-world driving may not be a realistic, cost or time-efficient option to efficiently and effectively test such planning systems.

BRIEF SUMMARY

Aspects of the disclosure provide a method for controlling an autonomous vehicle. The method includes receiving, by one or more processors, a first trajectory generated by a first planning system; inputting, by the one or more processors, a portion of the first trajectory into a second planning system; receiving, by the one or more processors, a second trajectory generated by the second planning system based on the portion of the first trajectory; using, by the one or more processors, the second trajectory to determine whether to validate the first trajectory; and when the second trajectory is determined to be validated, enabling the autonomous vehicle to be controlled based on the first trajectory.

In one example, the first planning system is a joint space and time planning system, and wherein the second planning system is not a joint space and time planning system. In another example, the first planning system is not a joint space and time planning system, and wherein the second planning system is a joint space and time planning system. In another example, the first planning system is an updated version of the second planning system. In another example, using the second trajectory includes determining whether the second trajectory comes within a predetermined distance of a predicted location of a road user. In another example, using the second trajectory includes determining how the second trajectory performs with respect to a plurality of constraints. In this example, the plurality of constraints includes a deceleration limit. In addition, or alternatively, the plurality of constraints includes a lateral acceleration limit. In addition, or alternatively, the plurality of constraints includes a forward acceleration limit. In addition, or alternatively, the plurality of constraints includes a contextual speed constraint for a certain driving situation.

In another example, using the second trajectory includes: generating a score for the second trajectory; and comparing the score to a threshold value. In this example, generating the score includes: using a series of heuristics may be used to determine values for various aspects of the second trajectory; and combining the values to generate the score. In addition, or alternatively, generating the score includes inputting the second trajectory into a machine learned model which outputs the score.

In another example, the method also includes when the first trajectory is determined not to be validated, causing the second planning system to generate a new trajectory; and enabling the autonomous vehicle to be controlled based on the new trajectory. In this example, the method also includes, when the first trajectory is determined not to be validated, discarding the first trajectory. In addition, or alternatively, the method also includes, when the first trajectory is determined not to be validated, continuing to generate and use trajectories generated by the second planning system to control the autonomous vehicle for a predetermined number of planning iterations. Alternatively, the method further comprises, when the first trajectory is determined not to be validated, continuing to generate and use trajectories generated by the second planning system to control the autonomous vehicle until the autonomous vehicle is no longer in a driving situation which caused the second trajectory not to be validated.

Another aspect of the disclosure provides a method for controlling an autonomous vehicle. The method includes receiving, by one or more processors, a first trajectory generated by a first planning system; inputting, by the one or more processors, a portion of the first trajectory into a second planning system; receiving, by the one or more processors, a second trajectory generated by the second planning system based on the portion of the first trajectory; using, by the one or more processors, the second trajectory to determine whether to validate the first trajectory; when the first trajectory is determined not to be validated, causing, by the one or more processors, the second planning system to generate a new trajectory; and enabling, by the one or more processors, the autonomous vehicle to be controlled based on the new trajectory.

In one example, the method further comprises, when the first trajectory is determined not to be validated, discarding the first trajectory. In another example, the method further comprises, when the first trajectory is determined not to be validated, continuing to generate and use trajectories generated by the second planning system to control the autonomous vehicle for a predetermined number of planning iterations.

DETAILED DESCRIPTION

Overview

Figure 1:
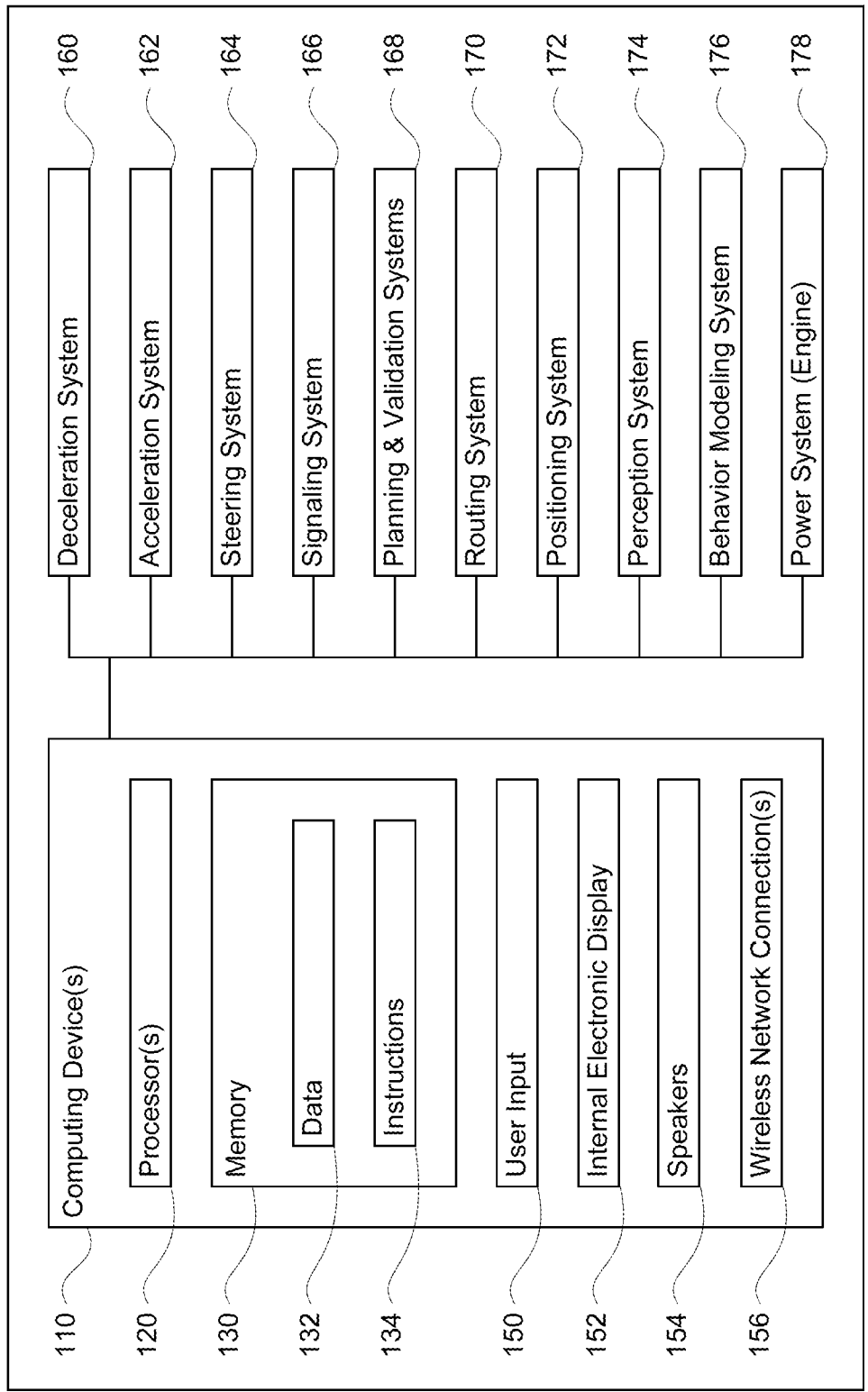
FIG. 1 is a functional diagram of an example vehicle in accordance with an exemplary embodiment.

The technology relates to validating trajectory planning for autonomous vehicles. As noted above, planning systems of autonomous vehicles may generate trajectories for an autonomous vehicle to follow for some brief period of time in order to follow a route to a destination. Such trajectories may include those that can be expressed as a function of time and are periodically and iteratively replaced (e.g., many times per second). The planning systems which generate these trajectories require significant testing. As such, when there are significant, or in some instances, even minor changes to such planning systems, the safety and reliability may again need to be rigorously tested in both simulated and real-world environments. However, many millions of miles of real-world driving may not be a realistic, cost or time-efficient option to efficiently and effectively test such planning systems.

In order to address these concerns, a trajectory generated by a first planning system may be validated by a validation system using a trajectory generated by a second planning system. This first planning system may be considered "untrusted" or not necessarily rigorously tested to meet safety standards or requirements of an autonomous vehicle transportation system. This second planning system may be one that is "trusted" or rather, has been rigorously tested. In this regard, the second planning system may be used to ensure the safety of the first planning system.

In order to do so, the first planning system may generate a trajectory according to a route in order to cause the autonomous vehicle to make progress towards a destination. For instance, a first trajectory generated by a first planning system may be received by a validation system of the autonomous vehicle. Before publishing the first trajectory to other systems of the autonomous vehicle in order to use the trajectory to control the autonomous vehicle, the validation system may validate the trajectory.

The validation system may select or identify a portion of the first trajectory, and input this portion into a second planning system. This portion of the first trajectory may be long enough for the autonomous vehicle to plan, validate, potentially re-plan a new trajectory, publish, receive and begin acting upon the next trajectory.

The second planning system may then generate a second trajectory from the end of the portion of the first trajectory. For instance, the second trajectory may build off of the state at the end of the portion of the first trajectory such that the second trajectory may diverge from the first trajectory after this portion of the first trajectory. This second trajectory may then be provided to and received by the validation system.

The validation system may attempt to validate the first trajectory. This may involve determining whether the second trajectory is considered "safe", for example, according to the policy goals and requirements of a transportation or other service utilizing the autonomous vehicle. In the simplest of validation processes, the validation system may determine whether the second trajectory intersects with or comes within some predetermined distance of a predicted location of another object. If not, the first trajectory may be validated, and if so, the first trajectory may not be validated. In more complex validation processes, the validation system may determine whether the second trajectory is at least as good as a third trajectory generated by the second planning system. Other validation processes may examine more than simply proximity to other objects or other road users.

In some instances, the validation process may generate a score for the second trajectory. Such scores may be compared to a hand-tuned threshold value to determine whether the second trajectory is "too bad", not safe, and as such, if the first trajectory should not be validated.

If the first trajectory is validated or rather, the second trajectory is determined to be safe, the validation system can allow the first trajectory to be published to other systems of the autonomous vehicle so that the autonomous vehicle can safely drive at least the portion of the first trajectory. In this regard, so long as the portions of first trajectories are validated, the autonomous vehicle may continue to follow trajectories generated by the first planning system to reach the destination.

If the first trajectory is not validated, the first trajectory may be discarded and a new trajectory may be generated by the second planning system and used to control the autonomous vehicle. As such, in each planning iteration, the validation system confirms that the first planning system can plan safely, so that if there is a problem, the validation system can switch the autonomous vehicle to the second planning system even in the worst case. The validation system may thereafter immediately revert back to generating and validating trajectories from the first planning system in the next iteration, or may continue to use trajectories generated by the second planning system exclusively for some period.

While the features described herein are especially useful for testing in real-world driving situations. A similar approach may be used for evaluation purposes in simulations to evaluate how well the first planning system performs.

The results of the real-world or simulated driving may then be used to improve the first planning system. For example, simulations where the second trajectory was not validated may be flagged for further review. Similarly, instances of real-world driving where the second trajectory was not validated may be reported to a server computing device immediately (e.g., via a status update from the autonomous vehicle or other message).

The features described herein may enable an autonomous vehicle to validate trajectories generated by an "untrusted" planning system using a "trusted" planning system. This may allow for the testing of new planning systems, when there are significant, or in some instances, even minor changes to a trusted planning system in both simulation and real-world driving situations without the need to drive many millions of miles. Thus, this may provide a realistic, cost and time-efficient option to efficiently and effectively test such "untrusted" planning systems.

Example Systems

As shown in FIG. 1, an autonomous vehicle 100 in accordance with one aspect of the disclosure includes various components. Vehicles, such as those described herein, may be configured to operate in one or more different driving modes. For instance, in a manual driving mode, a driver may directly control acceleration, deceleration, and steering via inputs such as an accelerator pedal, a brake pedal, a steering wheel, etc. An autonomous vehicle may also operate in one or more autonomous driving modes including, for example, a semi or partially autonomous driving mode in which a person exercises some amount of direct or remote control over driving operations, or a fully autonomous driving mode in which the vehicle handles the driving operations without direct or remote control by a person. These vehicles may be known by different names including, for example, autonomously driven vehicles, self-driving vehicles, and so on.

The U.S. National Highway Traffic Safety Administration (NHTSA) and the Society of Automotive Engineers (SAE) have each identified different levels to indicate how much, or how little, a vehicle controls the driving, although different organizations may categorize the levels differently. Moreover, such classifications may change (e.g., be updated) overtime.

As described herein, in a semi or partially autonomous driving mode, even though the vehicle assists with one or more driving operations (e.g., steering, braking and/or accelerating to perform lane centering, adaptive cruise control or emergency braking), the human driver is expected to be situationally aware of the vehicle's surroundings and supervise the assisted driving operations. Here, even though the vehicle may perform all driving tasks in certain situations, the human driver is expected to be responsible for taking control as needed.

In contrast, in a fully autonomous driving mode, the control system of the vehicle performs all driving tasks and monitors the driving environment. This may be limited to certain situations such as operating in a particular service region or under certain time or environmental restrictions, or may encompass driving under all conditions without limitation. In a fully autonomous driving mode, a person is not expected to take over control of any driving operation.

Unless indicated otherwise, the architectures, components, systems and methods described herein can function in a semi or partially autonomous driving mode, or a fully-autonomous driving mode.

While certain aspects of the disclosure are particularly useful in connection with specific types of vehicles, the vehicle may be any type of vehicle including, but not limited to, cars, trucks (e.g., garbage trucks, tractor-trailers, pickup trucks, etc.), motorcycles, buses, recreational vehicles, street cleaning or sweeping vehicles, etc. The vehicle may have one or more computing devices, such as computing device 110 containing one or more processors 120, memory 130 and other components typically present in general purpose computing devices.

The memory 130 stores information accessible by the one or more processors 120, including data 132 and instructions 134 that may be executed or otherwise used by the processor 120. The memory 130 may be of any type capable of storing information accessible by the processor, including a computing device or computer-readable medium, or other medium that stores data that may be read with the aid of an electronic device, such as a hard-drive, memory card. ROM, RAM. DVD or other optical disks, as well as other write-capable and read-only memories. Systems and methods may include different combinations of the foregoing, whereby different portions of the instructions and data are stored on different types of media.

The instructions 134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 132 may be retrieved, stored or modified by processor 120 in accordance with the instructions 134. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processors 120 may be any conventional processors, such as commercially available CPUs or GPUs. Alternatively, the one or more processors may include a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

Computing devices 110 may include all of the components normally used in connection with a computing device such as the processor and memory described above as well as a user input 150 (e.g., one or more of a button, mouse, keyboard, touch screen and/or microphone), various electronic displays (e.g., a monitor having a screen or any other electrical device that is operable to display information), and speakers 154 to provide information to a passenger of the autonomous vehicle 100 or others as needed. For example, internal display 152 may be located within a cabin of autonomous vehicle 100 and may be used by computing devices 110 to provide information to passengers within the autonomous vehicle 100.

Computing devices 110 may also include one or more wireless network connections 156 to facilitate communication with other computing devices, such as other client computing devices and server computing devices. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

Computing devices 110 may be part of an autonomous control system for the autonomous vehicle 100 and may be capable of communicating with various components of the vehicle in order to control the vehicle in an autonomous driving mode. For example, returning to FIG. 1, computing devices 110 may be in communication with various systems of autonomous vehicle 100, such as deceleration system 160, acceleration system 162, steering system 164, signaling system 166, planning and validation systems 168, routing system 170, positioning system 172, perception system 174, behavior modeling system 176, and power system 178 in order to control the movement, speed, etc. of autonomous vehicle 100 in accordance with the instructions 134 of memory 130 in the autonomous driving mode.

As an example, computing devices 110 may interact with deceleration system 160 and acceleration system 162 in order to control the speed of the vehicle. Similarly, steering system 164 may be used by computing devices 110 in order to control the direction of autonomous vehicle 100. For example, if autonomous vehicle 100 is configured for use on a road, such as a car or truck, steering system 164 may include components to control the angle of wheels to turn the vehicle. Computing devices 110 may also use the signaling system 166 in order to signal the vehicle's intent to other drivers or vehicles, for example, by lighting turn signals or brake lights when needed.

Routing system 170 may be used by computing devices 110 in order to generate a route to a destination location using map information. Planning and validation systems 168 may be used by computing device 110 in order to generate short-term trajectories that allow the vehicle to follow routes generated by the routing system. In this regard, the planning and validation systems 168 and/or routing system 166 may store detailed map information, e.g., pre-stored, highly detailed maps identifying a road network including the shape and elevation of roadways, lane lines, intersections, crosswalks, speed limits, traffic signals, buildings, signs, real time traffic information (updated as received from a remote computing device), parking spots, vegetation, or other such objects and information.

Figure 2:
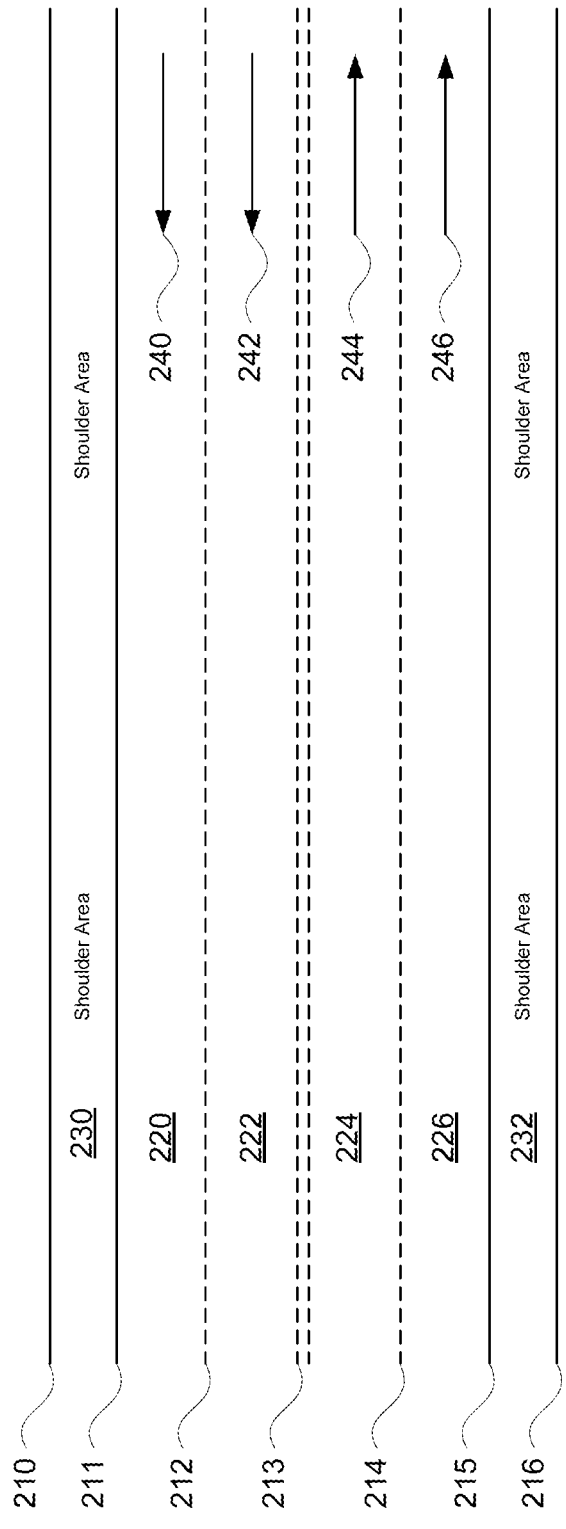
FIG. 2 is an example of map information in accordance with aspects of the disclosure.

FIG. 2 is an example of map information 200 for a geographic location corresponding to a small section of roadway. The map information 200 that includes information identifying the shape, location, and other characteristics of lane features such as curbs 210, 216, fog lines 211, 215, and more typical lane lines such as dashed lines 212 (e.g., white lane lines diving lanes of the same direction of traffic), 213 (e.g., yellow lane lines dividing lanes of different traffic directions), 214 (e.g., white lane lines diving lanes of the same direction of traffic), etc. These lane features may define the shape and boundaries of driving lanes 220, 222, 224, 226 and shoulder areas 230, 232. Although not shown, the map information also includes other features of the intersections such as traffic control devices including traffic signal lights, stop signs, yield signs, speed limit signs, informational signs, and so on. In addition to the aforementioned features and information, the map information may also include information that identifies the direction of traffic for each lane, as represented by arrows 240, 242, 244, 246, as well as information that allows the computing devices 110 to determine whether the vehicle has the right of way to complete a particular maneuver (i.e., complete a turn or cross a lane of traffic or intersection). In this regard, the map information 200 may identify various features which the autonomous vehicle 100's systems may use to localize the autonomous vehicle as well as to generate routes to a destination and trajectories to follow in order to reach that destination.

The map information may be configured as a roadgraph. The roadgraph may include a plurality of graph nodes and edges representing features such as crosswalks, traffic lights, road signs, road or lane segments, etc., that together make up the road network of the map information. Each edge is defined by a starting graph node having a specific geographic location (e.g., latitude, longitude, altitude, etc.), an ending graph node having a specific geographic location (e.g., latitude, longitude, altitude, etc.), and a direction. This direction may refer to a direction the autonomous vehicle 100 must be moving in in order to follow the edge (i.e., a direction of traffic flow). The graph nodes may be located at fixed or variable distances. For instance, the spacing of the graph nodes may range from a few centimeters to a few meters and may correspond to the speed limit of a road on which the graph node is located. In this regard, greater speeds may correspond to greater distances between graph nodes. The edges may represent driving along the same driving lane or changing driving lanes. Each node and edge may have a unique identifier, such as a latitude and longitude location of the node or starting and ending locations or nodes of an edge. In addition to nodes and edges, the map may identify additional information such as types of maneuvers required at different edges as well as which lanes or mapped areas are drivable.

The routing system 166 may use the aforementioned map information to determine a route from a current location (e.g., a location of a current node) to a destination location. Routes may be generated using a cost-based analysis which attempts to select a route to the destination location with the lowest cost. Costs may be assessed in any number of ways such as time to the destination location, distance traveled (each edge may be associated with a cost to traverse that edge), types of maneuvers required, convenience to passengers or the vehicle, etc. For example, each individual edge in the roadgraph may be associated with a cost. These costs may be summed together with or without additional costs (e.g., additional costs for maneuvers or convenience, etc.) in order to determine the overall cost of a particular route. When multiple routes are generated, the route with the lowest overall cost may be selected by the routing system and published to the various other systems of the autonomous vehicle. For example, between a route with a large number of intersections with traffic controls (such as stop signs or traffic signal lights) versus one with no or very few traffic controls, the latter route may have a lower cost (e.g., because it is faster) and therefore be preferable. Each route may include a list of a plurality of nodes and edges which the vehicle can use to reach the destination location. Routes may be recomputed periodically as the vehicle travels to the destination location.

The map information used for routing may be the same or a different map as that used for planning trajectories. For example, the map information used for planning routes not only requires information on individual driving lanes, but also the nature of driving and bicycle lane boundaries (e.g., solid white, dash white, solid yellow, etc.) to determine where lane changes are allowed. However, unlike the map used for planning trajectories, the map information used for routing need not include other details such as the locations of crosswalks, traffic lights, stop signs, etc., though some of this information may be useful for routing purposes.

Positioning system 172 may be used by computing devices 110 in order to determine the vehicle's relative or absolute position on a map or on the earth. For example, the positioning system 172 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude, a location of a node or edge of the roadgraph as well as relative location information, such as location relative to other cars immediately around it, which can often be determined with less noise than the absolute geographical location.

The positioning system 172 may also include other devices in communication with computing devices 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

The perception system 174 also includes one or more components for detecting objects external to the vehicle such as other road users (vehicles, pedestrians, bicyclists, etc.) obstacles in the roadway, traffic signals, signs, trees, buildings, etc. For example, the perception system 174 may include Lidars, sonar, radar, cameras, microphones and/or any other detection devices that generate and/or record data which may be processed by the computing devices of computing devices 110. In the case where the vehicle is a passenger vehicle such as a minivan or car, the vehicle may include Lidar, cameras, and/or other sensors mounted on or near the roof, fenders, bumpers or other convenient locations.

Figure 3A:
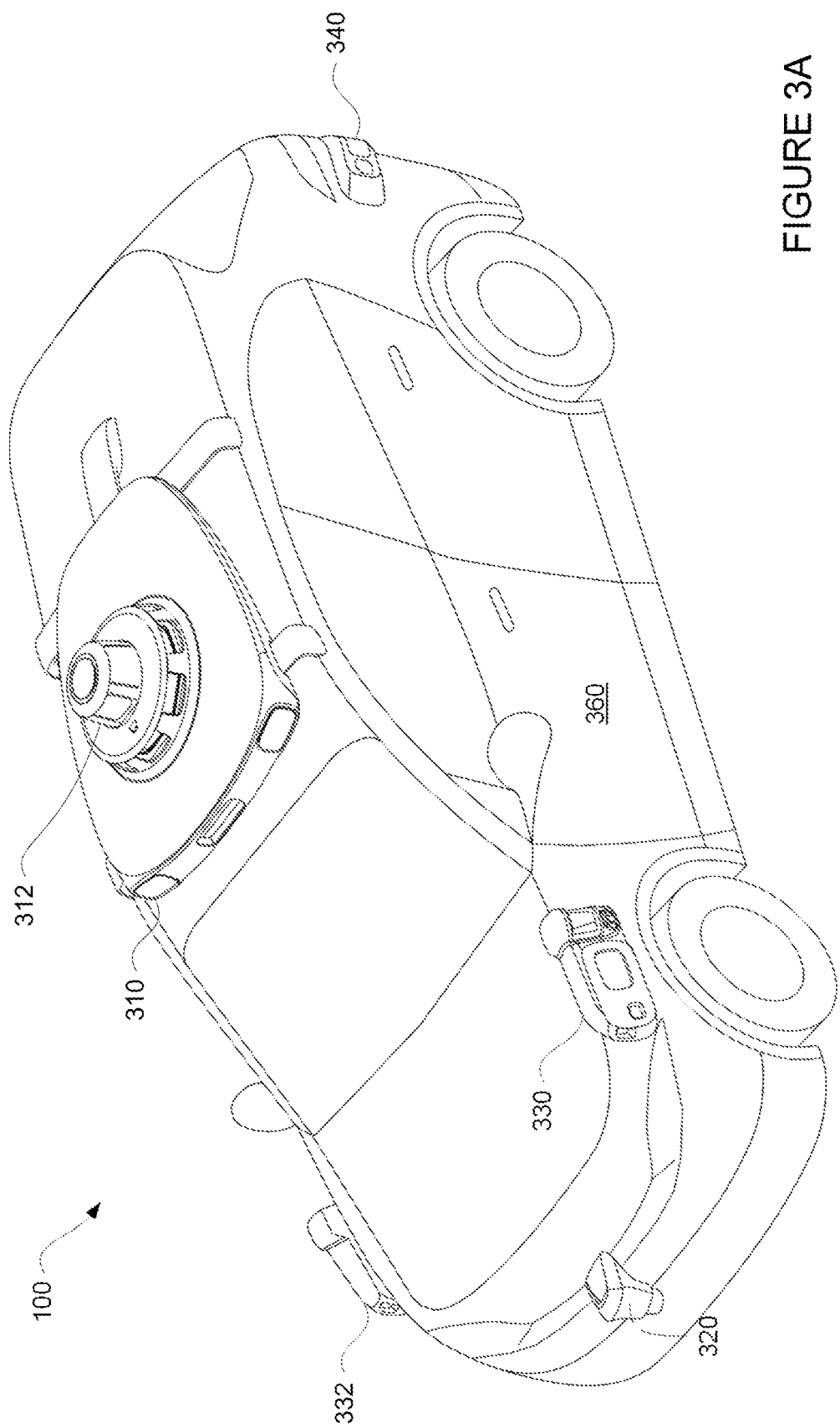
FIG. 3A-3B are example external views of a vehicle in accordance with aspects of the disclosure.
Figure 3B:
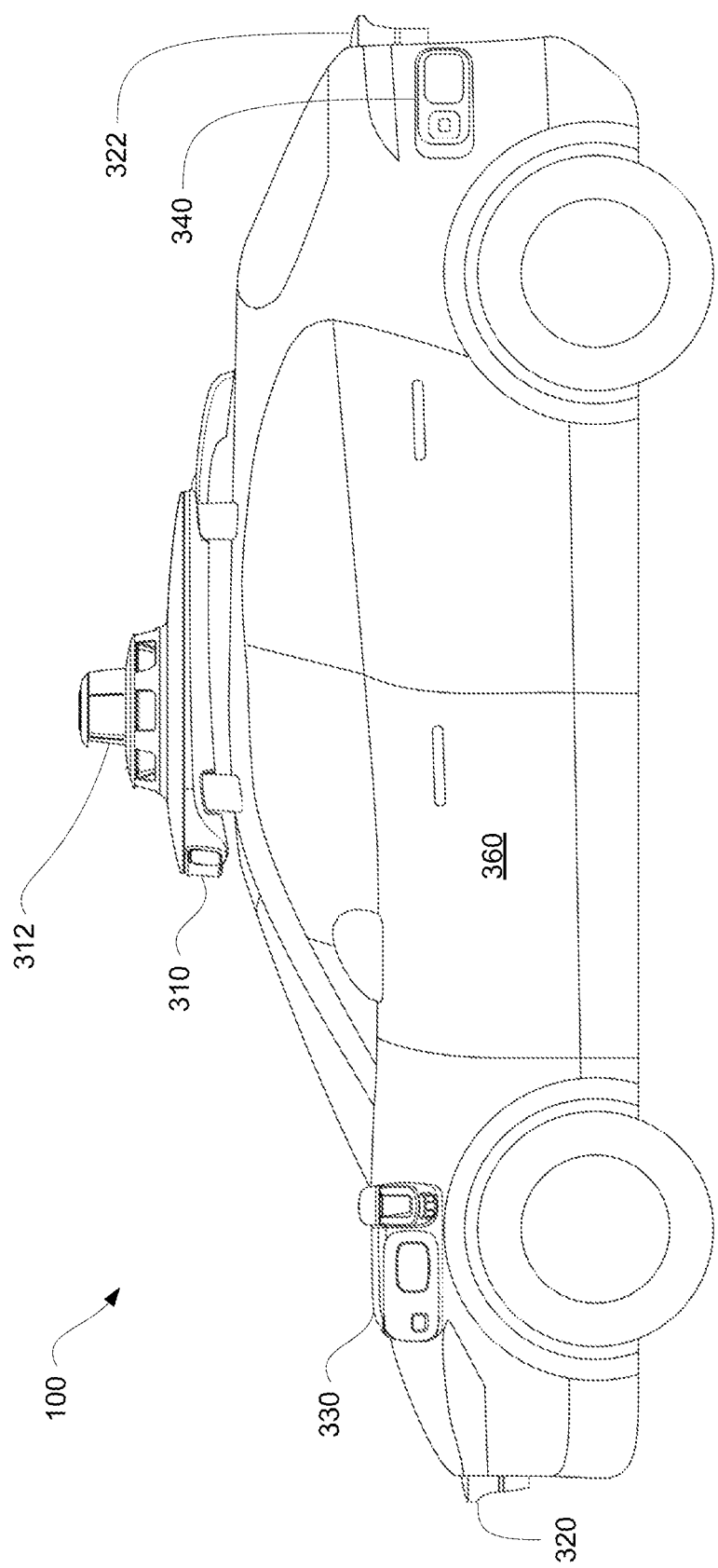

For instance, FIGS. 3A-3B are an example external views of autonomous vehicle 100. In this example, roof-top housing 310 and upper housing 312 may include a Lidar sensor as well as various cameras and radar units. Upper housing 312 may include any number of different shapes, such as domes, cylinders, "cake-top" shapes, etc. In addition, housing 320, 322 (shown in FIG. 3B) located at the front and rear ends of autonomous vehicle 100 and housings 330, 332 on the driver's and passenger's sides of the vehicle may each store a Lidar sensor and, in some instances, one or more cameras. For example, housing 330 is located in front of driver door 360. Autonomous vehicle 100 also includes a housing 340 for radar units and/or cameras located on the driver's side of the autonomous vehicle 100 proximate to the rear fender and rear bumper of autonomous vehicle 100. Another corresponding housing (not shown may also be arranged at the corresponding location on the passenger's side of the autonomous vehicle 100. Additional radar units and cameras (not shown) may be located at the front and rear ends of autonomous vehicle 100 and/or on other positions along the roof or roof-top housing 310.

Computing devices 110 may be capable of communicating with various components of the vehicle in order to control the movement of autonomous vehicle 100 according to primary vehicle control code of memory of computing devices 110. For example, returning to FIG. 1, computing devices 110 may include various computing devices in communication with various systems of autonomous vehicle 100, such as deceleration system 160, acceleration system 162, steering system 164, signaling system 166, planning and validation systems 168, routing system 170, positioning system 172, perception system 174, behavior modeling system 176, and power system 178 (i.e. the vehicle's engine or motor) in order to control the movement, speed, etc. of autonomous vehicle 100 in accordance with the instructions 134 of memory 130.

The various systems of the vehicle may function using autonomous vehicle control software in order to determine how to control the vehicle. As an example, a perception system software module of the perception system 174 may use sensor data generated by one or more sensors of an autonomous vehicle, such as cameras, Lidar sensors, radar units, sonar units, etc., to detect and identify objects and their characteristics. These characteristics may include location, type, heading, orientation, speed, acceleration, change in acceleration, size, shape, etc.

In some instances, characteristics may be input into a behavior modeling system software module of the behavior modeling system 176 which uses various behavior models based on object type to output one or more behavior predictions or predicted trajectories for a detected object to follow into the future (e.g., future behavior predictions or predicted future trajectories). In this regard, different models may be used for different types of objects, such as pedestrians, bicyclists, vehicles, etc. The behavior predictions or predicted trajectories may be a list of positions and orientations or headings (e.g., poses) as well as other predicted characteristics such as speed, acceleration or deceleration, rate of change of acceleration or deceleration, etc.

In other instances, the characteristics from the perception system 174 may be put into one or more detection system software modules, such as a traffic light detection system software module configured to detect the states of known traffic signals, construction zone detection system software module configured to detect construction zones from sensor data generated by the one or more sensors of the vehicle as well as an emergency vehicle detection system configured to detect emergency vehicles from sensor data generated by sensors of the vehicle. Each of these detection system software modules may use various models to output a likelihood of a construction zone or an object being an emergency vehicle.

Detected objects, predicted trajectories, various likelihoods from detection system software modules, the map information identifying the vehicle's environment, position information from the positioning system 172 identifying the location and orientation of the vehicle, a destination location or node for the vehicle as well as feedback from various other systems of the vehicle may be input into a planning system software module of the planning and validation systems 168. The planning and validation systems 168 may use this input to generate planned trajectories for the vehicle to follow for some brief period of time into the future based on a route generated by a routing module of the routing system 170.

Figure 6:
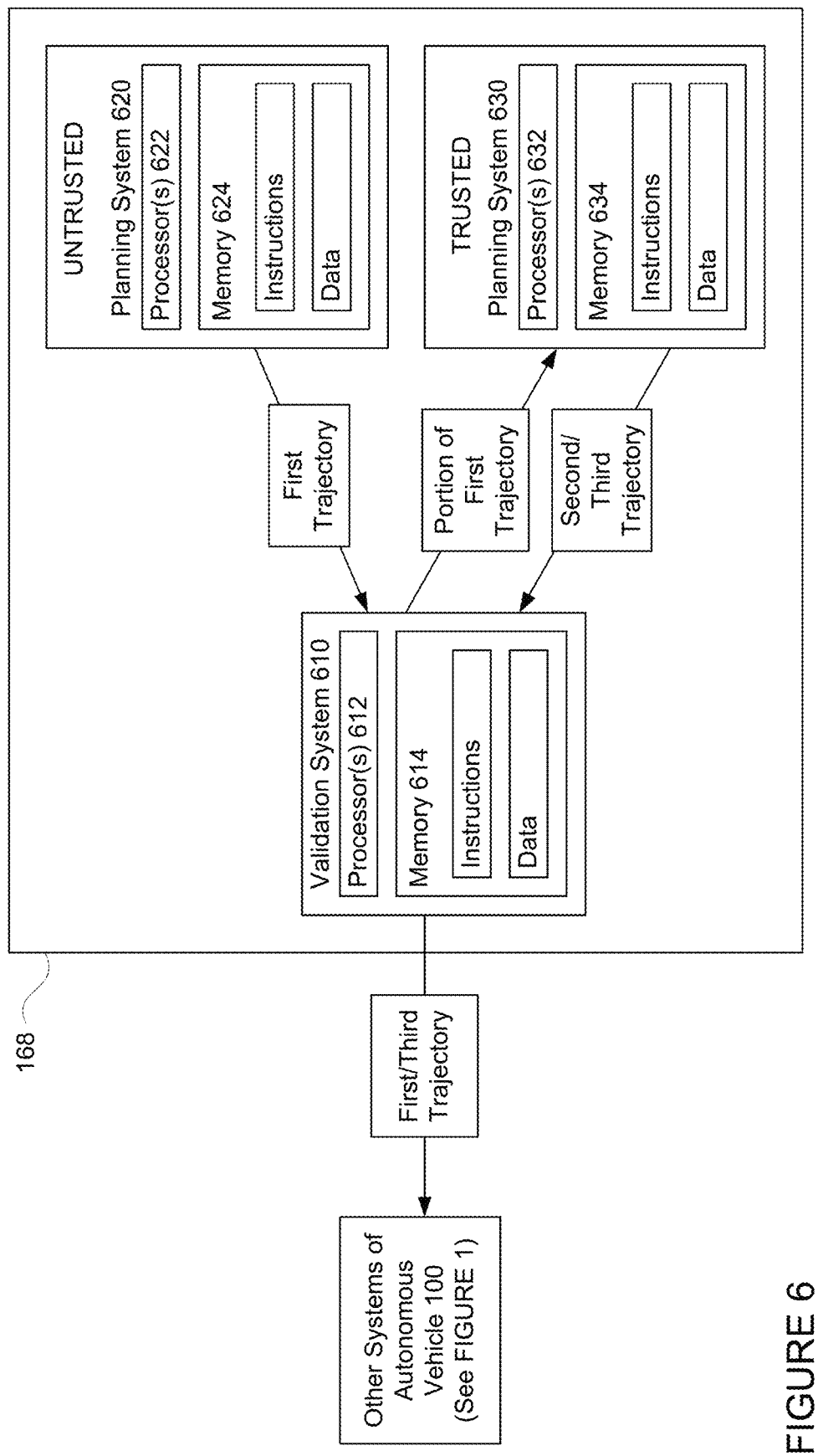
FIG. 6 is an example functional diagram of planning and validation systems in accordance with aspects of the disclosure.

FIG. 6 provides an example functional view of the planning and validation systems 168. In this example, a validation system 610 includes one or more processors 612 and memory 614 which may be configured similarly to the one or more processors 120 and memory 130, respectively. The validation system 610 may serve a "gatekeeping" function by validating trajectories before such trajectories are published to the various other systems of the autonomous vehicle (e.g., the computing devices 110 for control of the autonomous vehicle). In this regard, the validation system may be in communication with two or more planning systems 620 and 630. In this regard, each of the planning systems 620, 630 may include one or more processors 622, 632 and memory 624, 634 configured similarly to the processors 120 and memory 130, respectively. The memory of each of the planning systems may store planning system software modules configured to enable the processors of the respective planning system 620, 630 to generate or plan trajectories for the autonomous vehicle to follow.

In this example, the planning system 620 may be considered an "untrusted" planning system which has been rigorously tested to meet safety standards or requirements of an autonomous vehicle transportation system. The planning system 630 may be one that is "trusted" or rather, has been rigorously tested. In this regard, the validation system 610 may use the planning system 630 may be used to ensure the safety of the planning system 620.

The planning system 630 may be different from the planning system 620. In some instances, these planning systems may be significantly different, such that they utilize different planning processes such as independently planning in space (geometry) and then in time (speed plan) as compared to simultaneously planning in space and time. In other instances, these planning systems may be only minorly different, such as by utilizing different versions of the same software (e.g., an updated version to address a particular situation of concern could have unexpected effects in other situations).

A "planning iteration" may involve one or both of the planning systems 620, 630 generating a trajectory and this trajectory being published to various other systems of the autonomous vehicle. The next planning iteration may then be initiated in order to plan and publish a next trajectory and so on. Each planning iteration may be generated based on updated information received from the various systems of the autonomous vehicle 100, including for example, the routing system, positioning system, perception system, and so on.

Each of the planning systems 620, 630 may use similar process as described above with regard to assessing costs of routes may be used for computing costs of and selecting a trajectory (e.g., a first or a second trajectory as discussed below) for each planning iteration. In some instances, during a planning iteration, the planning system 620 and/or the planning system 630 may generate a plurality of potential trajectories. The costs of each edge of a potential trajectory may be summed together with or without additional costs (e.g., additional costs for maneuvers or convenience, getting too close to other objects, etc.) in order to determine the overall cost of the potential trajectory. The lowest cost potential trajectory may then be selected by the planning system as the next trajectory for the autonomous vehicle to follow.

Each planned trajectory may provide a planned path and other instructions for an autonomous vehicle to follow for some brief period of time into the future, such as 10 seconds or more or less. In this regard, the trajectories may define the specific characteristics of acceleration, deceleration, speed, direction, etc. to allow the vehicle to follow the route towards reaching a destination location. A control system software module of computing devices 110 may be configured to control movement of the vehicle, for instance by controlling braking, acceleration and steering of the vehicle, in order to follow a trajectory.

The computing devices 110 may control the vehicle in one or more of the autonomous driving modes by controlling various components. For instance, by way of example, computing devices 110 may navigate the vehicle to a destination location completely autonomously using data from the detailed map information and planning and validation systems 168. Computing devices 110 may use the positioning system 172 to determine the vehicle's location and perception system 174 to detect and respond to objects when needed to reach the location safely. Again, in order to do so, computing device 110 and/or planning and validation systems 168 may generate trajectories and cause the vehicle to follow these trajectories, for instance, by causing the vehicle to accelerate (e.g., by supplying fuel or other energy to the engine or power system 178 by acceleration system 162), decelerate (e.g., by decreasing the fuel supplied to the engine or power system 178, changing gears, and/or by applying brakes by deceleration system 160), change direction (e.g., by turning the front or rear wheels of autonomous vehicle 100 by steering system 164), and signal such changes (e.g., by lighting turn signals) using the signaling system 166. Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

Figure 4:
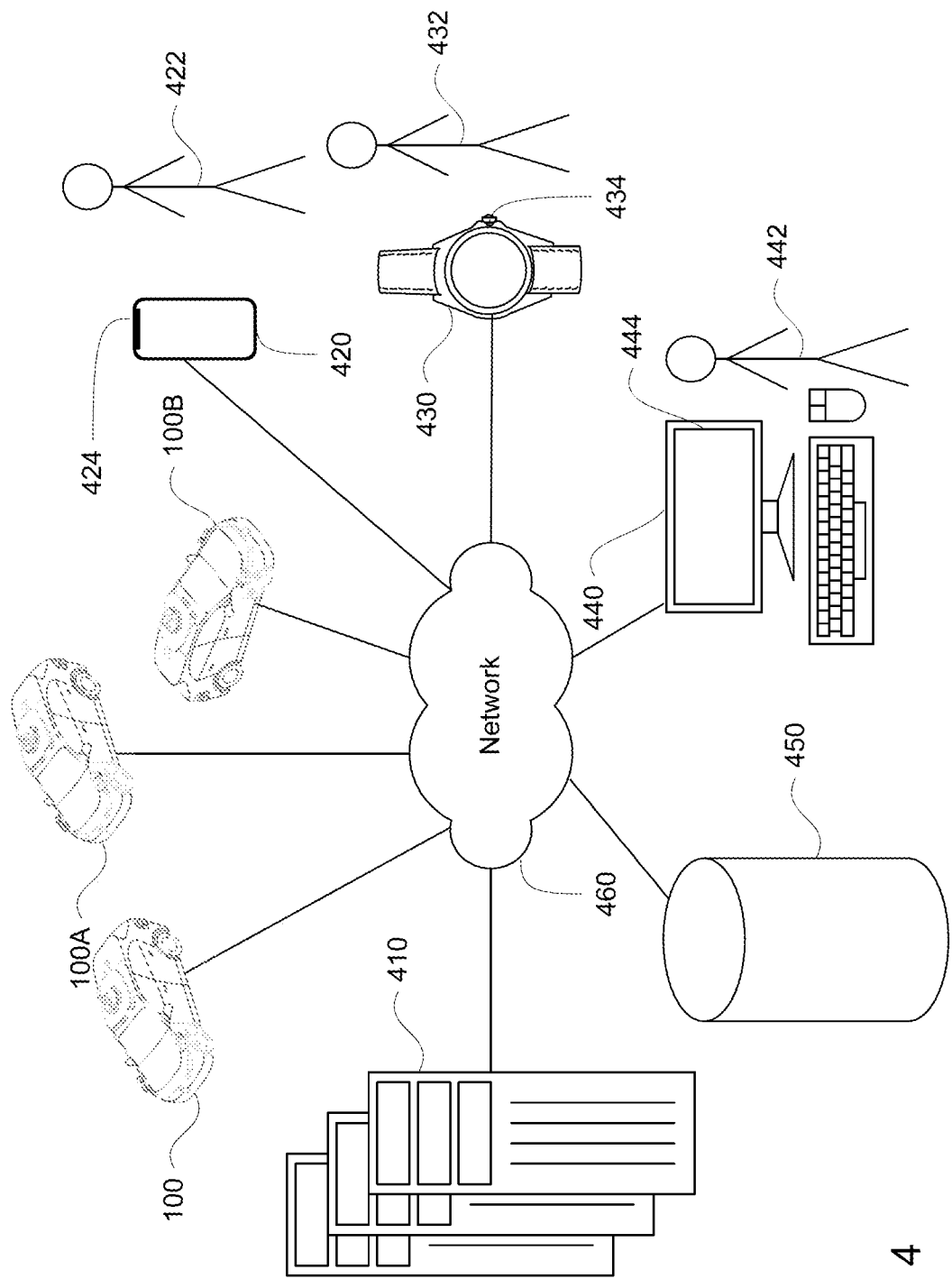
FIG. 4 is a pictorial diagram of an example system in accordance with aspects of the disclosure.
Figure 5:
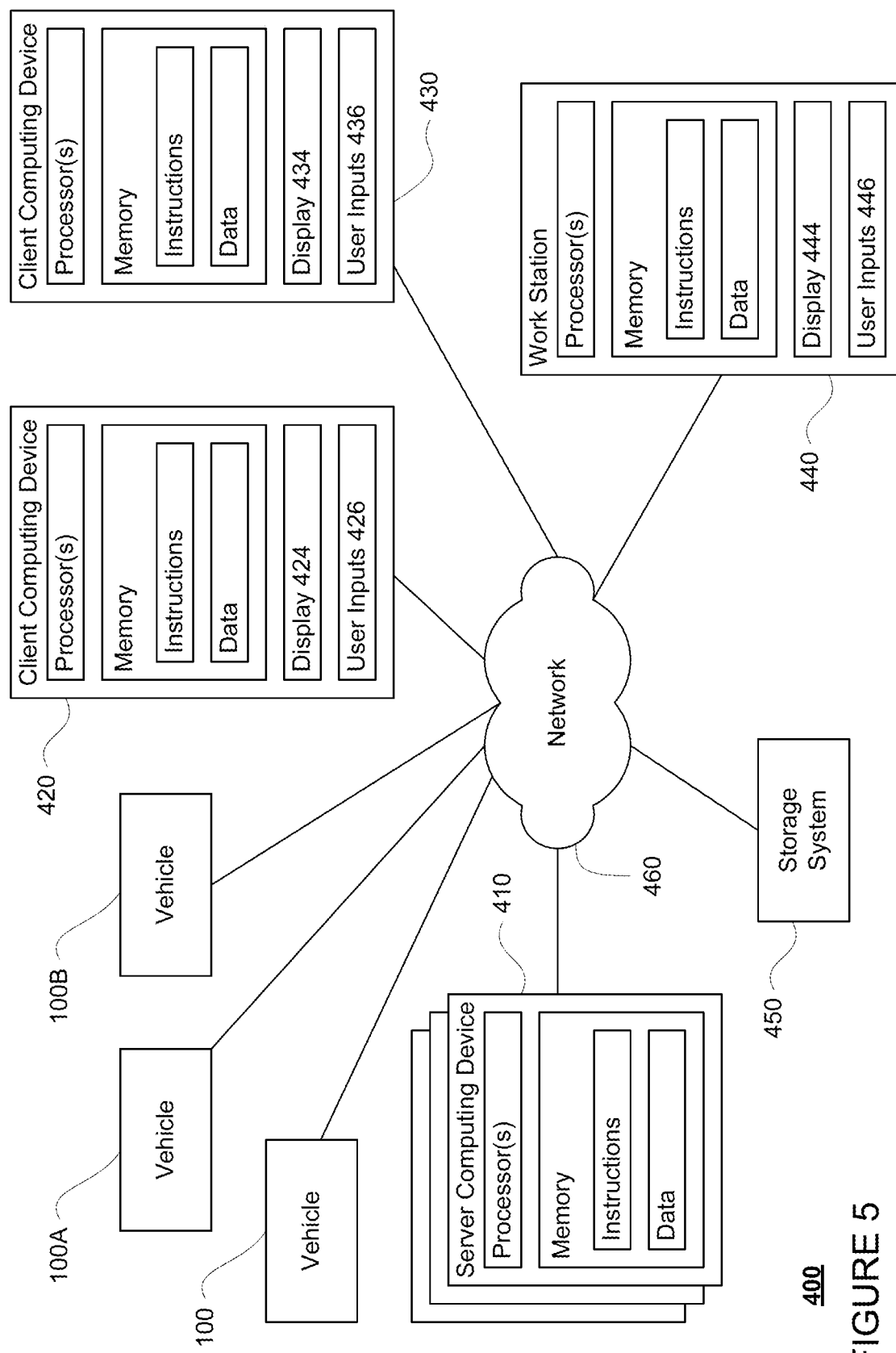
FIG. 5 is a functional diagram of the system of FIG. 4 in accordance with aspects of the disclosure.

Computing device 110 of autonomous vehicle 100 may also receive or transfer information to and from other computing devices, such as those computing devices that are a part of the transportation service as well as other computing devices. FIGS. 4 and 5 are pictorial and functional diagrams, respectively, of an example system 400 that includes a plurality of computing devices 410, 420, 430, 440 and a storage system 450 connected via a network 460. System 400 also includes autonomous vehicle 100A and autonomous vehicle 100B, which may be configured the same as or similarly to autonomous vehicle 100. Although only a few vehicles and computing devices are depicted for simplicity, a typical system may include significantly more.

As shown in FIG. 5, each of computing devices 410, 420, 430, 440 may include one or more processors, memory, data and instructions. Such processors, memories, data and instructions may be configured similarly to one or more processors 120, memory 130, data 132, and instructions 134 of computing device 110.

The network 460, and intervening graph nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 410 may include one or more server computing devices having a plurality of computing devices, e.g., a load balanced server farm, that exchange information with different nodes of a network for the purpose of receiving, processing and transmitting the data to and from other computing devices. For instance, one or more computing devices 410 may include one or more server computing devices that are capable of communicating with computing device 110 of autonomous vehicle 100 or a similar computing device of autonomous vehicle 100A or autonomous vehicle 100B as well as computing devices 420, 430, 440 via the network 460. For example, autonomous vehicles 100, 100A, 100B, may be a part of a fleet of vehicles that can be dispatched by server computing devices to various locations. In this regard, the server computing devices 410 may function as a scheduling system which can be used to arrange trips for passengers by assigning and dispatching vehicles such as autonomous vehicles 100, 100A, 100B. These assignments may include scheduling trips to different locations in order to pick up and drop off those passengers. In this regard, the server computing devices 410 may operate using scheduling system software in order to manage the aforementioned autonomous vehicle scheduling and dispatching. In addition, the computing devices 410 may use network 460 to transmit and present information to a user, such as user 422, 432, 442 on a display, such as displays 424, 434, 444 of computing devices 420, 430, 440. In this regard, computing devices 420, 430, 440 may be considered client computing devices.

As shown in FIG. 4, each client computing device 420, 430 may be a personal computing device intended for use by a user 422, 432 and have all of the components normally used in connection with a personal computing device including a one or more processors (e.g., a central processing unit (CPU)), memory (e.g., RAM and internal hard drives) storing data and instructions, a display such as displays 424, 434, 444 (e.g., a monitor having a screen, a touch-screen, a projector, a television, or other device that is operable to display information), and user input devices 426, 436, 446 (e.g., a mouse, keyboard, touchscreen or microphone). The client computing devices may also include a camera for recording video streams, speakers, a network interface device, and all of the components used for connecting these elements to one another.

Although the client computing devices 420, 430 may each comprise a full-sized personal computing device, they may alternatively comprise mobile computing devices capable of wirelessly exchanging data with a server over a network such as the Internet. By way of example only, client computing device 420 may be a mobile phone or a device such as a wireless-enabled PDA, a tablet PC, a wearable computing device or system, or a netbook that is capable of obtaining information via the Internet or other networks. In another example, client computing device 430 may be a wearable computing system, such as a wristwatch as shown in FIG. 3. As an example, the user may input information using a small keyboard, a keypad, microphone, using visual signals with a camera, or a touch screen. As yet another example, client computing device 440 may be a desktop computing system including a keyboard, mouse, camera and other input devices.

In some examples, client computing device 420 may be a mobile phone used by a passenger of an autonomous vehicle. In other words, user 422 may represent a passenger or a scheduler as discussed herein. In addition, client computing device 430 may represent a smart watch for a passenger of an autonomous vehicle. In other words, user 432 may represent a passenger or a scheduler as discussed herein. The client computing device 440 may represent a workstation for an operations person, for example, a remote assistance operator or other operations personnel who may provide remote assistance to an autonomous vehicle and/or a passenger. In other words, user 442 may represent an operator (e.g., operations person) of a transportation service utilizing the autonomous vehicles 100, 100A, 100B. Although only a few passengers, schedulers and operations persons are shown in FIGS. 4 and 5, any number of such passengers and remote assistance operators (as well as their respective client computing devices) may be included in a typical system.

As with memory 130, storage system 450 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIGS. 4 and 4, and/or may be directly connected to or incorporated into any of computing devices 110, 410, 420, 430, 440, etc.

The storage system 450 may store various map information which may be the same or similar to the map information 200 described above. The map information may also include information that the server computing devices 410 can provide to client computing devices in order to display maps to users as discussed further below.

The storage system 450 may store information about the status of various autonomous vehicles of the fleet. This status information may be periodically received in update messages which may be generated by the computing devices 110 of the autonomous vehicle and sent to the server computing devices 410 periodically. For example, such update messages may include information about the location of an autonomous vehicle, whether the autonomous vehicle is transporting passengers, etc. In this regard, the server computing devices 410 may track this information by storing it in the storage system 450. In some instances, the update messages or other messages from the autonomous vehicles of the fleet may include information about whether the autonomous vehicles are using trajectories generated by the planning system 620 and/or the planning system 630.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 13:
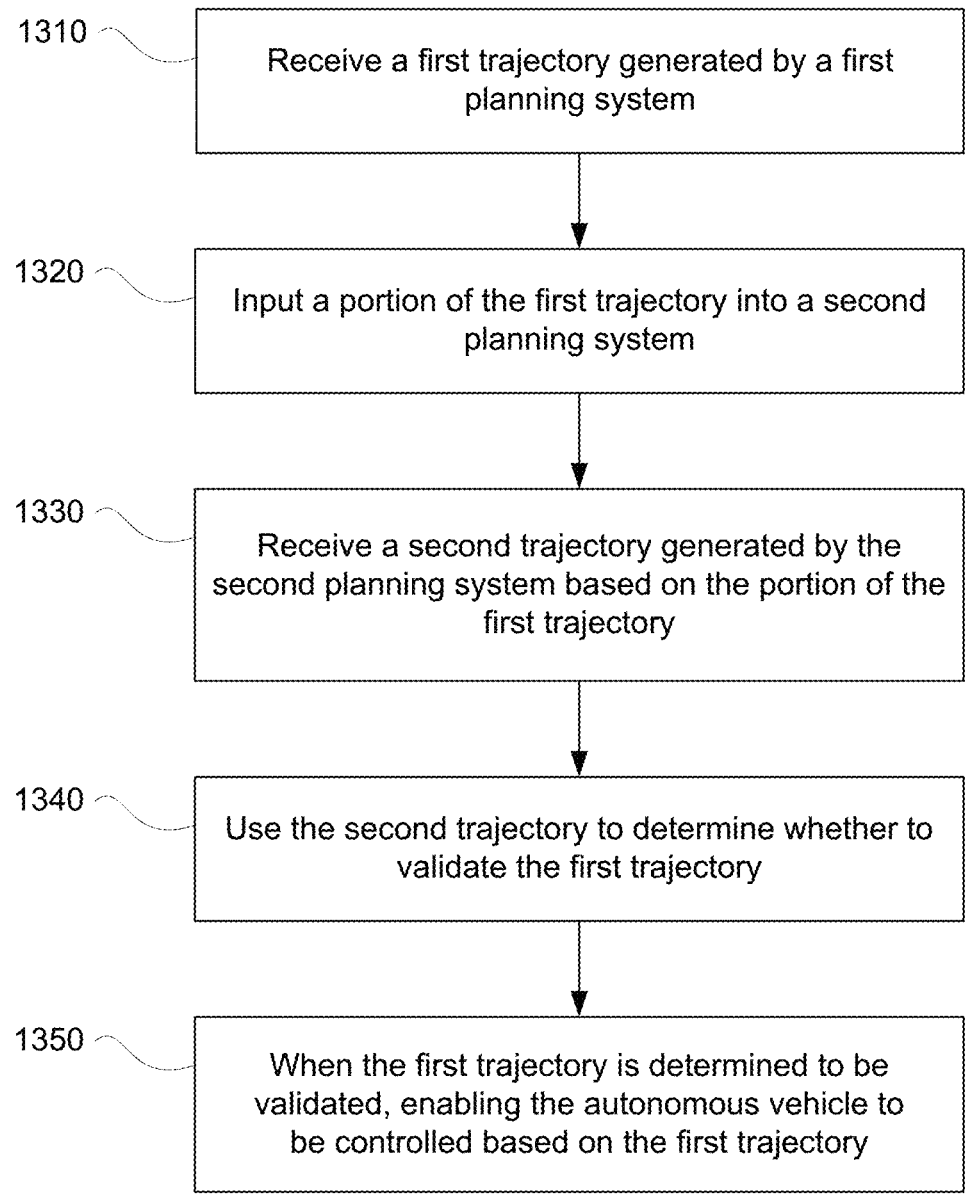
FIG. 13 is an example flow diagram in accordance with aspects of the disclosure.

FIG. 13 provides an example flow diagram 1300 for controlling an autonomous vehicle, which may be performed by one or more processors, such as the one or more processors of the computing devices 110 and/or of the planning and validation systems 168. As shown in block 1310, a first trajectory generated by a first planning system is received. For instance, the processors of the planning system 620 may use the planning system software module of the planning system 620 to generate a trajectory according to a route in order to cause the autonomous vehicle to make progress towards a destination. For instance, a first trajectory generated by the planning system 620 may be received by the validation system of the autonomous vehicle as depicted in FIG. 6.

Figure 7:
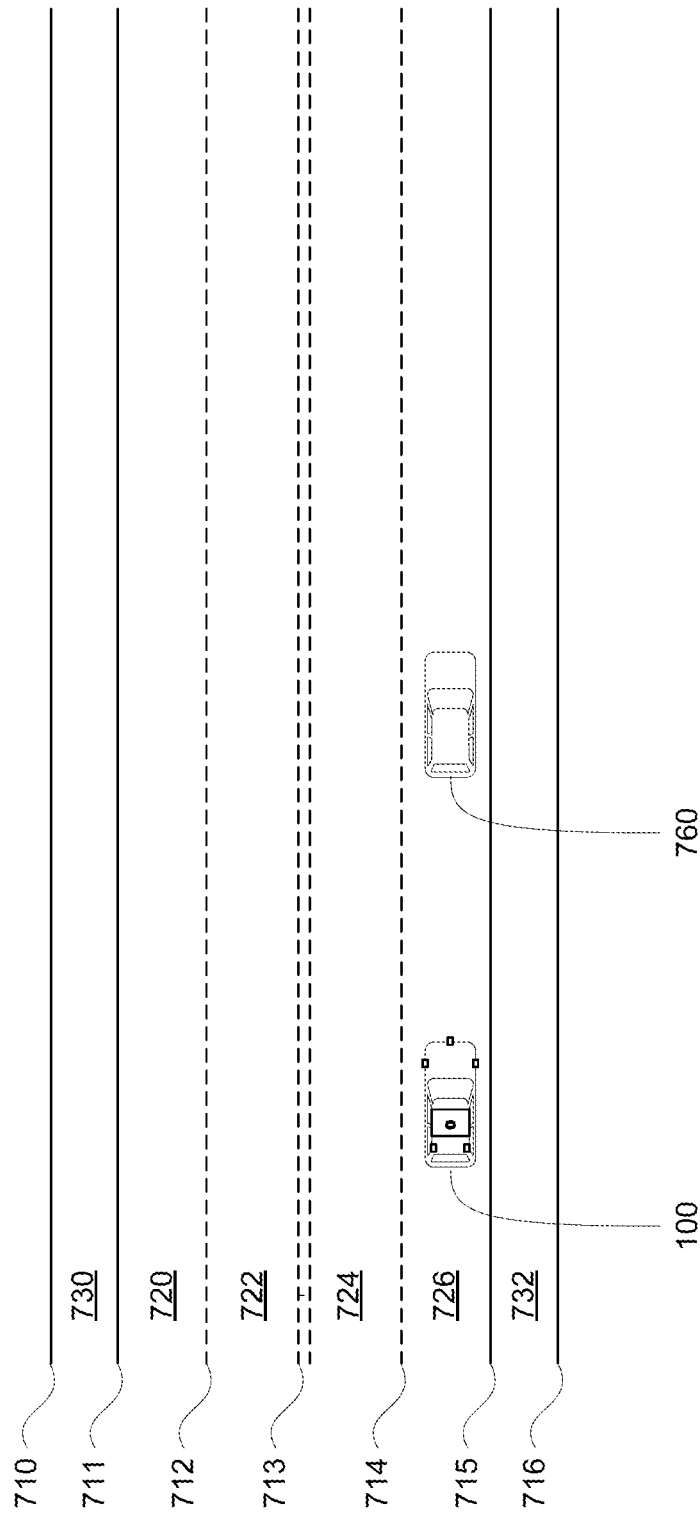
FIG. 7 is an example of an autonomous vehicle and a geographic area in accordance with aspects of the disclosure.
Figure 8:
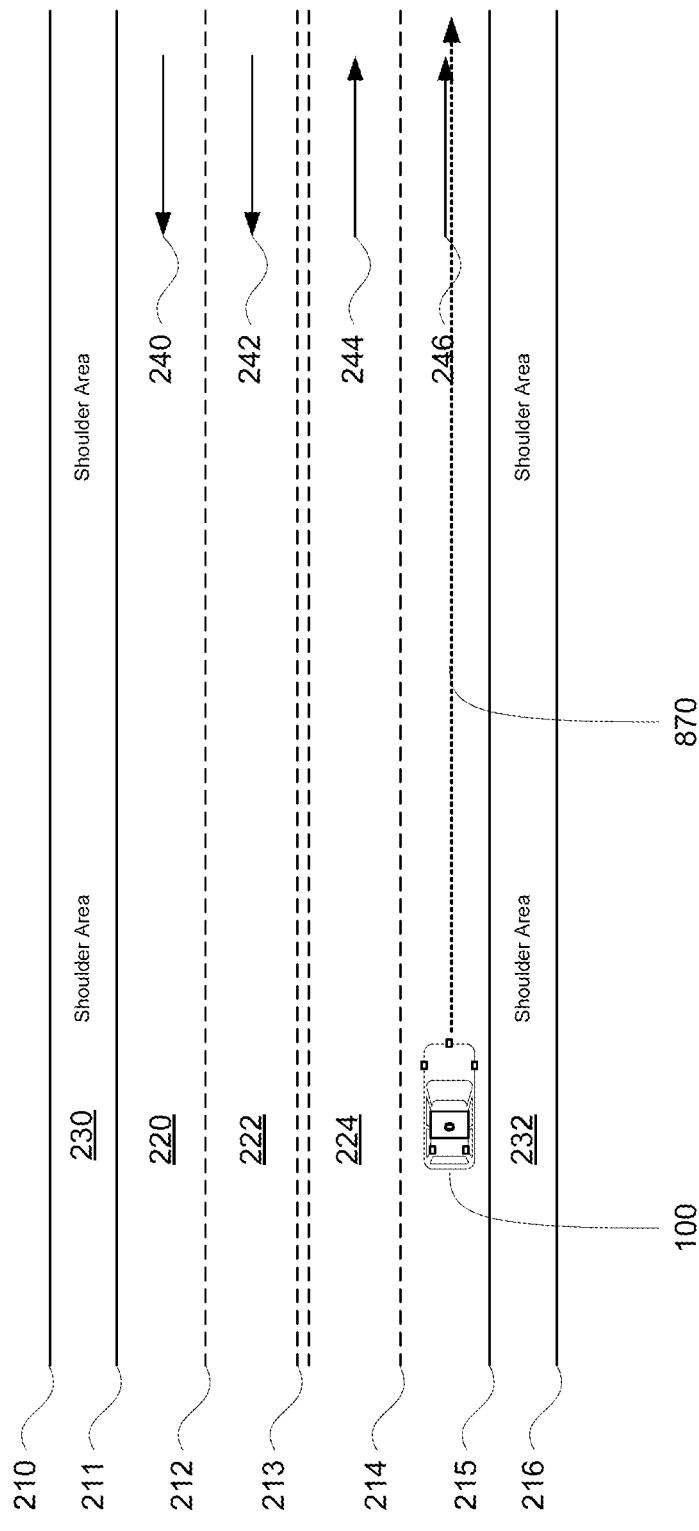
FIG. 8 is an example of an autonomous vehicle, map information, and a route in accordance with aspects of the disclosure.

FIG. 7 is an example of autonomous vehicle driving in a geographical area 700 corresponding to the geographic location and section of roadway of map information 200. In this regard, the shape, location, and other characteristics of lane features such as curbs 210, 216, fog lines 211, 215, dashed lines 212, 213, 214, driving lanes 220, 222, 224, 226, and shoulder areas 230, 232, may correspond to the shape, location, and other characteristics of lane features such as curbs 710, 716, fog lines 711, 715, dashed lines 712, 713, 714, driving lanes 720, 722, 724, 726, and shoulder areas 730, 732. In this example, the autonomous vehicle 100 is driving in driving lane 726 (or lane 226).

As noted above, the positioning system 172 may publish the autonomous vehicle's current location to the other systems of the autonomous vehicle 100. The current location may be used by the routing system 170 may generate a route from the autonomous vehicle's current location (provided by the positioning system 176). FIG. 7 also depicts the current route 870 (e.g., the most recent route published by the routing system to the other systems of the autonomous vehicle) to a destination at some location outside of the geographic area 700 (and therefore, not shown).

In addition, as shown in FIG. 7, the perception system 174 may detect and identify objects in the autonomous vehicle's environment, including other road users such as the vehicle 760. This data may be published by the perception system 174 to the other systems of the autonomous vehicle. The perception system 174 may also provide this information to the behavior modeling system 176 which may publish behavior predictions, for example, predicted trajectories or predicted locations for these other road users.

Figure 9:
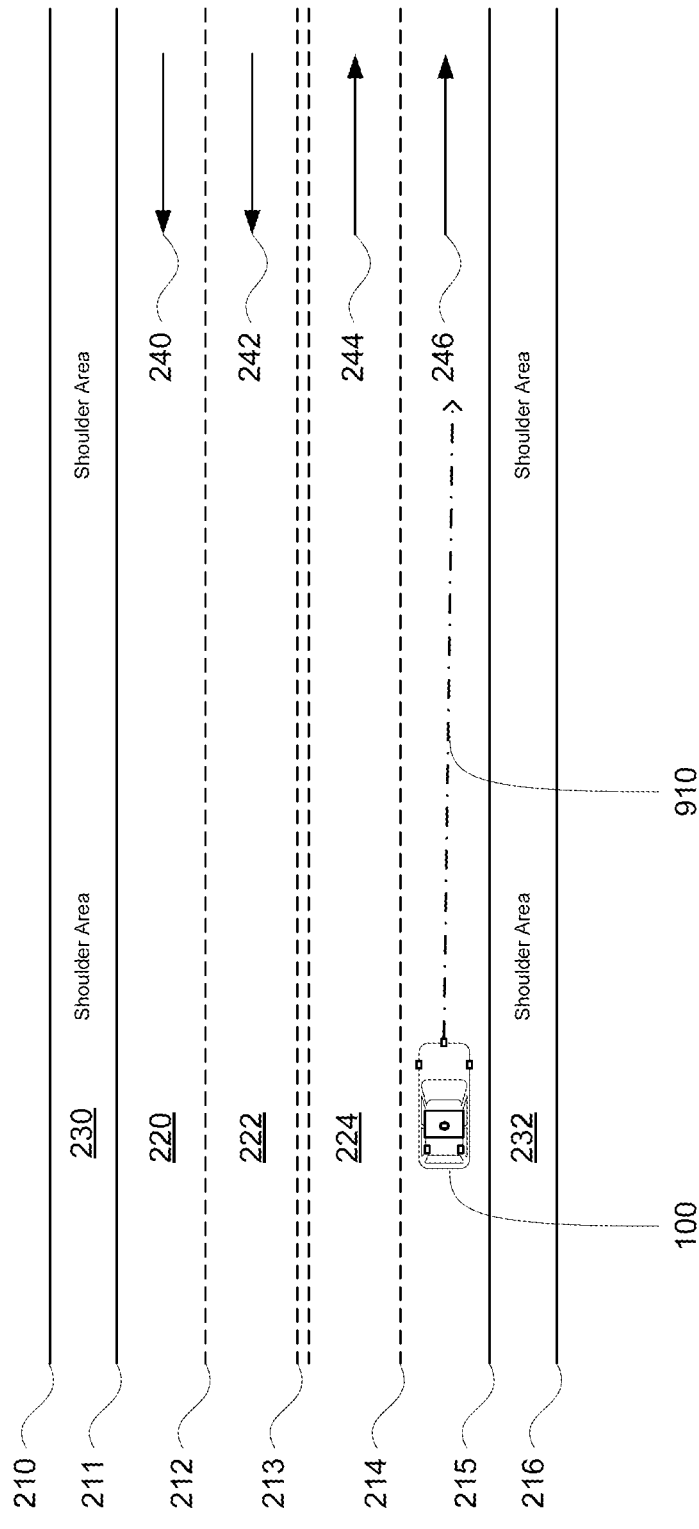
FIG. 9 is an example of an autonomous vehicle, map information, and a first trajectory in accordance with aspects of the disclosure.
Figure 10:
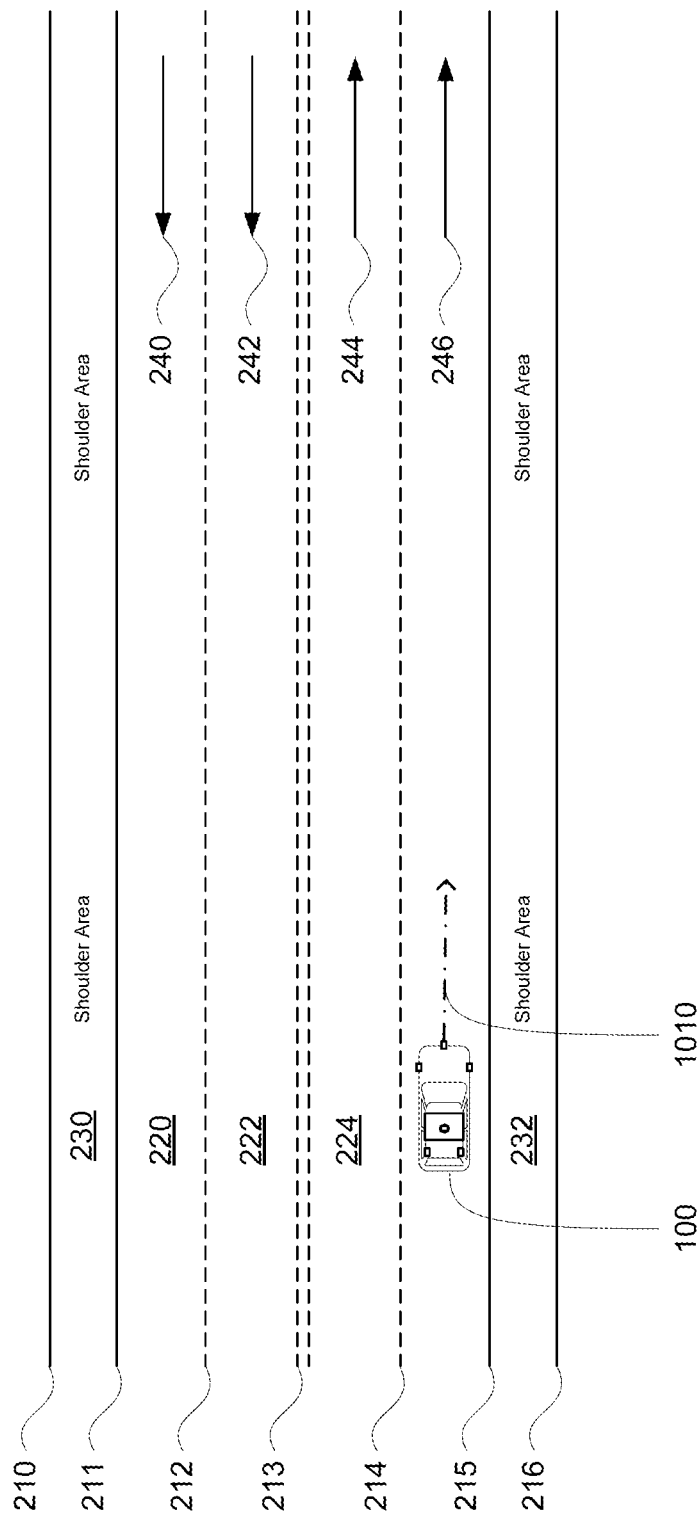
FIG. 10 is an example of an autonomous vehicle, map information, and a portion of a first trajectory in accordance with aspects of the disclosure.

The planning system 620 may generate trajectories based on the route (e.g., current route 870) to the destination received from the routing system 170, the data generated by the perception system 174 identifying the shape and location of objects detected in the vehicle's environment, the behavior predictions generated by the behavior modeling system 176, the map information 200, the vehicle's current location from the positioning system 172 of the autonomous vehicle, other current characteristics of the autonomous vehicle (e.g., speed, heading, orientation, deceleration or acceleration, rate of change of deceleration and acceleration, etc.), a trajectory planned by the planning system 620 in an immediately prior planning iteration, and so on. Again, as this trajectory is generated by an "untrusted" planning system, the validation system 610 may first validate the first trajectory before publishing the first trajectory to other systems of the autonomous vehicle. FIG. 9 is an example view of the map information 200 and including a first trajectory 910.

Returning to FIG. 13, at block 1320, a portion of the first trajectory is input into a second planning system. As noted above, before publishing the first trajectory to other systems of the autonomous vehicle in order to use the trajectory to control the autonomous vehicle, the validation system 610 may validate the trajectory. To do so, the validation system 610 may select or identify a portion of the first trajectory 910, and input this portion into a second planning system. For example, a portion of the first trajectory may be sent by the validation system 610 to the planning system 630 as shown in FIG. 6. This portion of the first trajectory may be long enough for the autonomous vehicle to plan, validate, potentially re-plan a new trajectory (e.g., if validation fails), publish, receive and begin acting upon the next trajectory. Thus, the length of this portion may be dependent upon the planning horizon of the planning system (e.g., how long in terms of time each trajectory is) as well as the processing capabilities of the validation and planning systems 168. FIG. 9 is an example view of the map information 200 and includes a portion 1010 of the first trajectory 910. Again, this portion 1010 of the first trajectory 910 may be sent by the validation system 610 to the planning system 630 as shown in FIG. 6.

Figure 11:
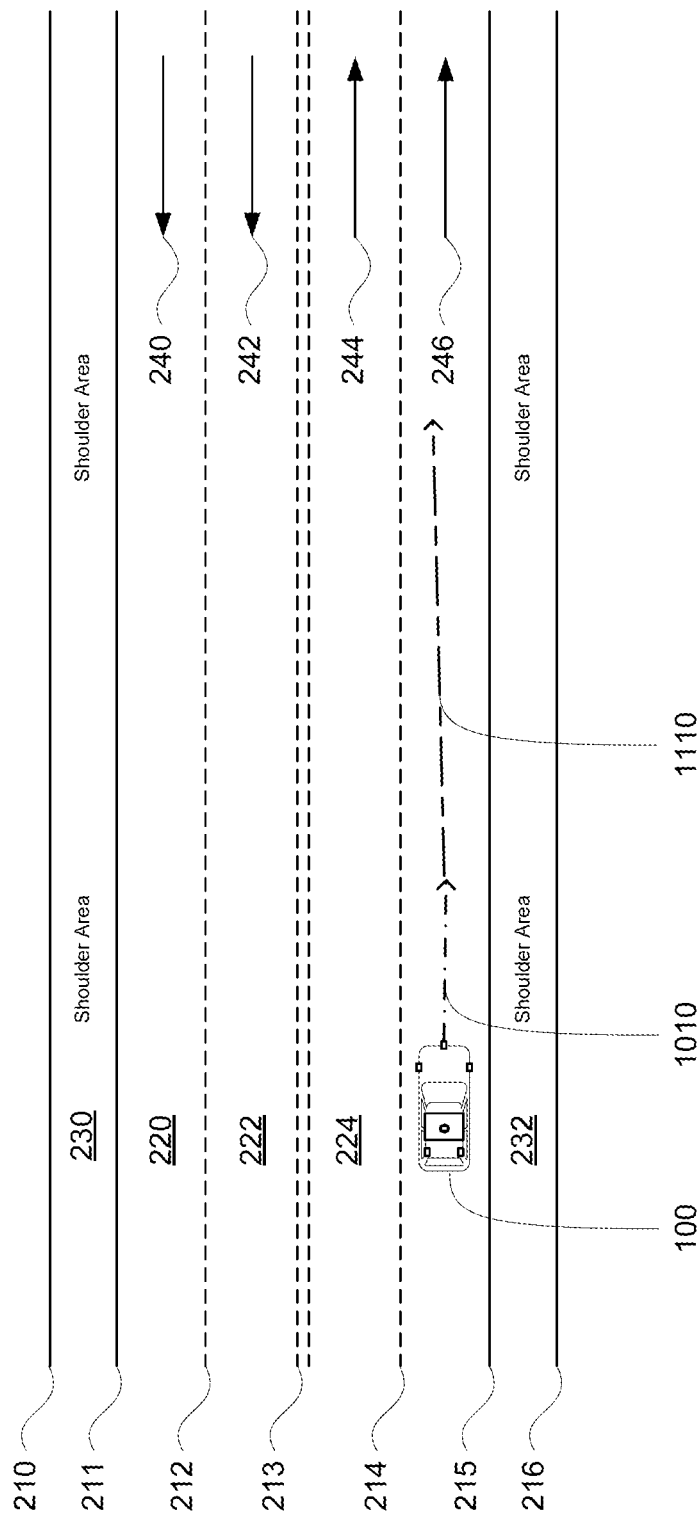
FIG. 11 is an example of an autonomous vehicle, map information, a portion of a first trajectory, and a second trajectory in accordance with aspects of the disclosure.

The planning system 630, or rather the "trusted" planning system" may then generate a second trajectory based on, or for example starting from the end of, the portion of the first trajectory. For instance, the second trajectory may build off of the portion of the first trajectory and/or the expected state of the autonomous vehicle at the end of the portion 1010 of the first trajectory 910 such that the second trajectory may diverge from the first trajectory after this portion of the first trajectory. In this regard, the expected state may include information such as a location of the autonomous vehicle, orientation of the autonomous vehicle, heading of the autonomous vehicle, deceleration (or acceleration) of the autonomous vehicle, rate of change of deceleration (or acceleration) of the autonomous vehicle, lateral deceleration (or acceleration) values, and so on. As with the first trajectory, this second trajectory may be generated based on based on the route (e.g., current route 870) to the destination received from the routing system 170, the data generated by the perception system 174 identifying the shape and location of objects detected in the vehicle's environment, the behavior predictions generated by the behavior modeling system 176, the map information 200, the portion of the first trajectory and/or the expected state of the autonomous vehicle according to the last state of the portion of the first trajectory, and so on. FIG. 11 is an example view of the map information 200 and includes the portion 1010 of the first trajectory 910 as well as a second trajectory 1110 that starts at the end of the portion 1010 of the first trajectory 910.

Returning to FIG. 13, at block 1330, a second trajectory generated by the second planning system based on the portion of the first trajectory is received. Once generated as described above, the second trajectory 1110 may then be provided to and received by the validation system 610 as shown in FIG. 6.

Returning to FIG. 13, at block 1340, the second trajectory is used to determine whether to validate the first trajectory. For instance, the validation system 610 may attempt to validate the first trajectory by analyzing the second trajectory. This may involve determining whether the second trajectory is considered "safe", for example, according to the policy goals and requirements of a transportation or other service utilizing the autonomous vehicle.

In the simplest of validation processes, the validation system 610 may determine whether the second trajectory 1110 intersects with or comes within some predetermined distance of a predicted location of another object (e.g., another road user). For example, if the second trajectory would bring the autonomous vehicle within a threshold distance of a predicted location (according to a behavior prediction generated by the behavior modeling system 176) of another road user, the validation system 610 may determine that the first trajectory cannot be validated. If the second trajectory would now bring the autonomous vehicle within a threshold distance of a predicted location (according to a behavior prediction generated by the behavior modeling system 176) of another road, the first trajectory may be validated. In this regard, the second trajectory may be used to validate the first trajectory.

Figure 12:
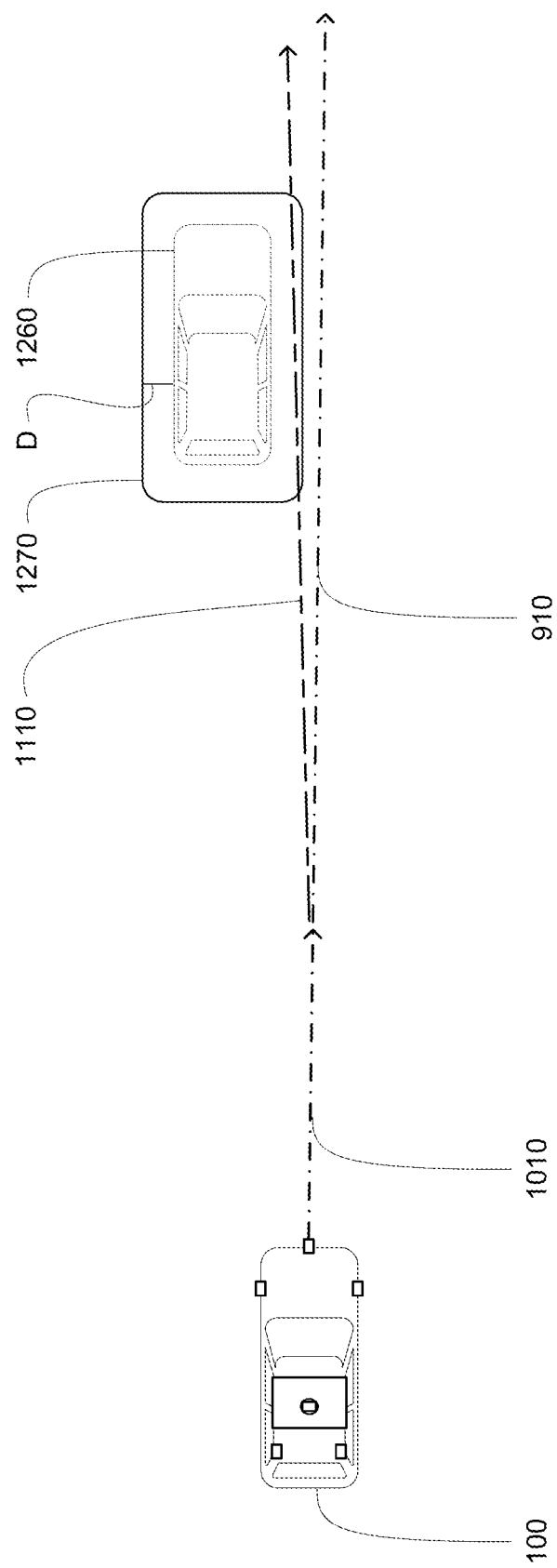
FIG. 12 is an example of an autonomous vehicle, a geographic area, a portion of a first trajectory, the first trajectory, a second trajectory, a predicted location of object, and a threshold distance in accordance with aspects of the disclosure.

Turning to FIG. 12, vehicle 1260 represents a predicted location of the vehicle 760 according to a behavior prediction of the behavior modeling system 176. In other words, vehicle 1260 represents an expected location of the vehicle 760 at some point in the future and within the planning horizon of the planning systems 620, 630. In this example, even though the first trajectory 910 may avoid the predicted location the second trajectory 1110 may come within a threshold distance D of that location represented by the area 1270 around the vehicle 1260. Accordingly, the validation system 610 may not validate the first trajectory 910. However, if the second trajectory 1110 avoided all of the predicted locations of any other road users detected by the perception system, the first trajectory may be validated.

In more complex validation processes, the validation system 610 may determine whether the second trajectory is at least as good as a third trajectory generated by the second planning system. For instance, rather than building off of the state at the end of the portion of the first trajectory, the third trajectory may start at some other state, such as the current state or some other of the autonomous vehicle along the current trajectory that the autonomous vehicle is currently following. In this regard, the third trajectory may be generated by the planning system 630 based on the route (e.g., current route 870) to the destination received from the routing system 170, the data generated by the perception system 174 identifying the shape and location of objects detected in the vehicle's environment, the behavior predictions generated by the behavior modeling system 176, the map information 200, the vehicle's current location from the positioning system 172 of the autonomous vehicle, other current characteristics of the autonomous vehicle (e.g., speed, heading, orientation, deceleration or acceleration, rate of change of deceleration and acceleration, etc.), and so on. The validation system 610 may determine whether the second trajectory gets closer to the predicted location of another road user than the third trajectory. If not, the first trajectory may be validated, and if so, the first trajectory may not be validated. In this regard, the validation system could simply determine which of the trajectories are better or sufficiently much better (e.g., at least a threshold difference between the first and second trajectories).

Other validation processes may examine more than simply proximity to other objects or other road users. For instance, the validation may involve determining various aspects such as whether the second plan comes close to hard or soft constraints used to generate the trajectories, such as braking or deceleration limits (e.g., simple deceleration or the rate of change of deceleration), forward and lateral acceleration limits (e.g., simple acceleration or the rate of change of acceleration, contextual speed constraints for specific types of objects or situations (e.g., when within 10 feet of X type of road user or within a school zone, do not go more than Y miles per hour), as well as whether or how the second trajectory complies with road rules or legal driving requirements, the amount of progress along the route, general comfort of passengers and other road users, and so on, as well as combinations of these. Other example driving situations may include driving in the presence of a pedestrian, a crosswalk, a motorcyclist, driving on a highway, certain maneuvers (such as unprotected turns).

In some instances, the validation process may generate a score for the second trajectory. For instance, a series of heuristics may be used to "score" various aspects of the second trajectory (including, for example, values of one or more of the aspects described above), and these scores may be combined (e.g., summed or summed using a plurality of weights) to determine a score for the second trajectory. Alternatively, the second trajectory, as well as the inputs to the planning systems may be input into a machine learned model which outputs a score that assesses the quality of the second trajectory. Such scores (heuristically or model-driven) may be compared to a hand-tuned threshold value to determine whether the second trajectory is "too bad," not safe. If the score is greater than the threshold, the first trajectory may not be validated.

Returning to FIG. 13, at block 1350, when the first trajectory is determined to be validated, the autonomous vehicle is enabled to be to be controlled based on the first trajectory. If the first trajectory is validated or rather, determined to be safe, the validation system 610 can allow the first trajectory to be published to other systems of the autonomous vehicle as shown in FIG. 6, so that the autonomous vehicle can safely drive at least the portion of the first trajectory. For example, the computing devices 110 may receive the first trajectory and may control the autonomous vehicle 100 using a smaller portion of the portion of the first trajectory until a next trajectory is published. In this regard, so long as the portions of first trajectories are validated, the autonomous vehicle 100 may continue to follow trajectories generated by the planning system 620 to reach the destination.

If the first trajectory 910 is not validated, the first trajectory may be discarded and a new trajectory may be generated by the planning system 630. In this regard, the planning system 630 may generate a new trajectory (for example, the third trajectory, discussed above). This third trajectory may be published to various other systems of the autonomous vehicle 100 as shown in FIG. 6, in order to enable the computing devices 110 to control the autonomous vehicle 100 using the third trajectory. As such, in each planning iteration, the validation system 610 may confirm whether the "untrusted" planning system or planning system 620 can plan safely using a trajectory generated by the "trusted" planning system, so that if there is a problem, the validation system 610 can switch the autonomous vehicle 100 to the "trusted" planning system or planning system 630 even in the worst case. By doing so, the autonomous vehicle may potentially avoid safety critical situations (e.g., collisions or potentially coming too close to another road user) while using and potentially still testing an "untrusted" planning system.

The validation system 610 may thereafter immediately revert back to generating and validating trajectories from the planning system 620 in the next planning iteration (e.g., when planning and in some instances also validating the next trajectory the autonomous vehicle 100 will follow), or may continue to use trajectories generated by the planning system 630 exclusively for some period. In this regard, trajectory generation by the planning system 620 may be stopped during the period or may simply be ignored (e.g., those trajectories may be discarded). This period may include a predetermined number of planning iterations, until the autonomous vehicle is no longer in a driving situation which resulted in the first trajectory not being validated. For example, if the second trajectory was not validated because it came too close to a pedestrian, the validation system 610 may continue to use trajectories generated by the planning system 630 until the autonomous vehicle passes the pedestrian. Alternatively, if the second trajectory was not validated because the score of the second trajectory met the threshold, the validation system 610 may continue to use trajectories generated by the planning system 630 until the score for any second trajectories in later planning iterations no longer meets the threshold.

While the features described herein may be especially useful for testing in real-world driving situations, a similar approach may be used for evaluation purposes in simulations to evaluate how well an "untrusted" planning system performs. In either case, the results of the real-world or simulated driving may then be used to improve the "untrusted" planning system. For example, simulations where the second trajectory was not validated by the validation system 610 may be flagged for further review in order to focus efforts to improve the planning system 620's planning behaviors. Similarly, instances of real-world driving where the second trajectory was not validated may be reported to a server computing device, such as the server computing devices 410, immediately (e.g., via a status update from the autonomous vehicle 100 or some other message). In addition, managers of the transportation system may be able to determine whether or not an "untrusted" planner is ready to become "trusted" because the planning system has met some safety benchmarks such as not needing to utilize trajectories generated by another "trusted" planning system after so many real-world driving miles, etc.

Although the examples described above relate to validating trajectories generated by a single "untrusted" planning system, a similar process may be used in order to validate trajectories generated by a plurality of planning systems in a single planning iteration. For instance, a plurality of "untrusted" first planning systems (similar to the planning system 620, but each of which may be different from one another), may be used to generate respective first trajectories. Portions of these first trajectories may then be used by the "trusted" planning system in order to plan respective second trajectories. If the respective second trajectories for such additional planning systems are validated, the validation system 610 may select between the trajectories generated by respective "untrusted" planning systems. A cost function may be used to evaluate, for example, using the scoring of aspects described above. This cost function may then be used to validate and select one of the first trajectories (e.g., a validated first trajectory with the lowest cost compared to other validated first trajectories) to be published to other systems of the autonomous vehicle 100 and for the autonomous vehicle to follow. If none of the respective second trajectories are validated, as in the examples above, the "trusted" planning system, such as planning system 630, may generate a new trajectory for the autonomous vehicle to follow. The validation system 610 may thereafter immediately revert back to generating and validating trajectories from the plurality of "untrusted" planning systems in the next planning iteration or may continue to use trajectories generated by the planning system 630 exclusively for some period.

The planning systems described above may be rules-based planning systems which primarily focus on using heuristics to generate trajectories. However, machine learned modeling may be used to implement future planning systems which may be tested using the features described herein. As such, the features described herein may even enable the testing of purely machine learned planning systems (e.g., as a first planning system or planning system 620) without requiring the autonomous vehicle to actually drive the trajectories generated by the machine learned planning system.

The features described herein may enable an autonomous vehicle to validate trajectories generated by an "untrusted" planning system using a "trusted" planning system. This may allow for the testing of new planning systems, when there are significant, or in some instances, even minor changes to a trusted planning system in both simulation and real-world driving situations without the need to drive many millions of miles. Thus, this may provide a realistic, cost and time-efficient option to efficiently and effectively test such "untrusted" planning systems.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only some of many possible embodiments. Further, the same reference numbers in different drawings can identify the same or similar elements.

The invention claimed is:

1. A method for controlling an autonomous vehicle, the method comprising:
   receiving, by one or more processors, a first trajectory generated by a first planning system;
   inputting, by the one or more processors, a portion of the first trajectory into a second planning system, wherein the second planning system is used to ensure safety of the first planning system;
   receiving, by the one or more processors, a second trajectory generated by the second planning system based on the portion of the first trajectory;
   using, by the one or more processors, the second trajectory to determine whether to validate the first trajectory; and
   when the first trajectory is determined to be validated, enabling the autonomous vehicle to be controlled based on the first trajectory.

2. The method of claim 1, wherein the first planning system is a joint space and time planning system, and wherein the second planning system is not a joint space and time planning system.

3. The method of claim 1, wherein the first planning system is not a joint space and time planning system, and wherein the second planning system is a joint space and time planning system.

4. The method of claim 1, wherein using the second trajectory includes determining whether the second trajectory comes within a predetermined distance of a predicted location of a road user.

5. The method of claim 1, wherein using the second trajectory includes determining how the second trajectory performs with respect to a plurality of constraints.

6. The method of claim 5, wherein the plurality of constraints includes a deceleration limit.

7. The method of claim 5, wherein the plurality of constraints includes a lateral acceleration limit.

8. The method of claim 5, wherein the plurality of constraints includes a forward acceleration limit.

9. The method of claim 5, wherein the plurality of constraints includes a contextual speed constraint for a certain driving situation.

10. The method of claim 1, wherein using the second trajectory includes:
    generating a score for the second trajectory; and
    comparing the score to a threshold value.

11. The method of claim 10, wherein generating the score includes:
    using a series of heuristics may be used to determine values for various aspects of the second trajectory; and
    combining the values to generate the score.

12. The method of claim 1, further comprising:
    when the first trajectory is determined not to be validated, causing the second planning system to generate a new trajectory; and
    enabling the autonomous vehicle to be controlled based on the new trajectory.

13. The method of claim 12, further comprising, when the first trajectory is determined not to be validated, discarding the first trajectory.

14. The method of claim 12, further comprising, when the first trajectory is determined not to be validated, continuing to generate and use trajectories generated by the second planning system to control the autonomous vehicle for a predetermined number of planning iterations.

15. The method of claim 1, further comprising, when the first trajectory is determined not to be validated, continuing to generate and use trajectories generated by the second planning system to control the autonomous vehicle.

16. A method for controlling an autonomous vehicle, the method comprising:
   receiving, by one or more processors, a first trajectory generated by a first planning system;
   inputting, by the one or more processors, a portion of the first trajectory into a second planning system, wherein the second planning system is used to ensure safety of the first planning system;
   receiving, by the one or more processors, a second trajectory generated by the second planning system based on the portion of the first trajectory;
   using, by the one or more processors, the second trajectory to determine whether to validate the first trajectory;
   when the first trajectory is determined not to be validated, causing, by the one or more processors, the second planning system to generate a new trajectory; and
   enabling, by the one or more processors, the autonomous vehicle to be controlled based on the new trajectory.

17. The method of claim 16, further comprising, when the first trajectory is determined not to be validated, discarding the first trajectory.

18. The method of claim 16, further comprising, when the first trajectory is determined not to be validated, continuing to generate and use trajectories generated by the second planning system to control the autonomous vehicle for a predetermined number of planning iterations.

* * * * *